(12) United States Patent
Kaitani et al.

(10) Patent No.: US 6,344,725 B2
(45) Date of Patent: Feb. 5, 2002

(54) METHOD AND APPARATUS FOR CONTROLLING A SYNCHRONOUS MOTOR

(75) Inventors: Toshiyuki Kaitani; Yoshihiko Kinpara; Naoki Nishiguchi, all of Tokyo; Katsushi Kobayashi, Nagoya, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/806,237

(22) Filed: Mar. 28, 2001

Related U.S. Application Data (63) Continuation of application No. PCT/JP99/04461, filed on Aug. 20, 1999.

(51) Int. Cl.$^7$ ............................. H02P 5/28; H02P 7/36
(52) U.S. Cl. ...................... 318/700; 318/701; 318/800; 318/799; 318/811
(58) Field of Search .................... 318/700–727, 318/799, 800–811; 363/95, 37, 34, 36

(56) References Cited

U.S. PATENT DOCUMENTS

| | | | |
|---|---|---|---|
| 4,792,741 A | * | 12/1988 | Matsuo et al. |
| 5,038,092 A | * | 8/1991 | Asano et al. |
| 5,537,308 A | * | 7/1996 | Gritter |
| 5,608,302 A | * | 3/1997 | Umida |
| 5,796,236 A | * | 8/1998 | Royak |
| 5,811,957 A | * | 9/1998 | Bose et al. |
| 6,081,087 A | * | 6/2000 | Iijima et al. |
| 6,163,127 A | * | 12/2000 | Patel et al. |
| 6,163,128 A | * | 12/2000 | Hiti et al. |

FOREIGN PATENT DOCUMENTS

| | | |
|---|---|---|
| JP | 8-308286 | 11/1996 |
| JP | 9-149700 | 6/1997 |
| JP | 9-191698 | 11/1997 |
| JP | 10-174499 | * 6/1998 |
| JP | 11-18499 | * 1/1999 |
| JP | 11-75394 | * 3/1999 |

OTHER PUBLICATIONS

"A Novel Technique for a DC Brushless Motor Having No Position Sensors", T.IEE Japan, vol. 111–D. No. 8, 1991, pp. 639–644.

"Initial Rotor Position Estimation of Sensorless Salient–Pole Brushless DC Motor", T.IEEE Japan, vol. 116–D, No. 7, 1996.

"Evaluation of Estimation Accuracy in Mechanical Sensor–less Rotor Position Detecting Method of Permanent Magnet Motor using Current Vector Locus" 1995 National Convention of the Industry Applications Society of the Institute of Electrical Engineers of Japan, 180.

* cited by examiner

*Primary Examiner*—Paul Ip
(74) *Attorney, Agent, or Firm*—Sughrue Mion, PLLC

(57) ABSTRACT

In the synchronous motor controlling apparatus and method of the invention, a current is detected and subjected to coordinate transformation onto γ-δ axis assumed for the rotor. A correction term is obtained on the basis of the derived current and an arbitrarily given correction current instruction. A γ-δ axis voltage instruction is computed by adding a value obtained by multiplying the correction term by a proper gain to a voltage equation in a steady state of the synchronous motor. Consequently, a control method of small computational load, which does not require gain adjustment according to the inertia of a motor load, can be attained.

5 Claims, 6 Drawing Sheets

FIG.6

METHOD AND APPARATUS FOR CONTROLLING A SYNCHRONOUS MOTOR

This application is a continuation of PCT Patent Application PCT/JP99/04461, filed Aug. 20, 1999, which was published in Japanese.

TECHNICAL FIELD

The present invention in general relates to an apparatus and method for controlling a synchronous motor. More particularly, this invention relates to an apparatus and method for controlling a synchronous motor having a magnet is buried in a rotor.

BACKGROUND ART

Various control methods related to a synchronous motor in which a permanent magnet is attached to the surface of the rotor (hereinbelow, called an SPM motor) and a synchronous motor in which a permanent magnet is buried in the rotor (hereinbelow, called an IPM motor), for driving the motor without providing a sensor for sensing a rotation position of the rotor are conventionally provided. For example, in (a) Japanese Patent Office Application Laid-Open No. 8-308286, (b) Japanese Patent Office Application Laid-Open No. 9-191698, and the like, a magnetic pole position is estimated on the basis of an error between an estimated current and an actual current, and a vector control of the synchronous motor is performed by using the result of estimation. Furthermore, (c) The Transactions of The Institute of Electrical Engineers of Japan, Vol. 111-D, No. 8, 1991, pp. 639–644 discloses a simple and easy voltage instruction operating method and a simple and easy primary angular frequency setting method in an SPM motor.

The method of (c) will be described in detail hereinbelow. It is additionally written that the γ-δ axis of (c) is opposite to that used in the present invention (the γ axis of (c) corresponds to the δ axis of the invention, and the δ axis of (c) corresponds to the γ axis of the invention).

Figure 6:
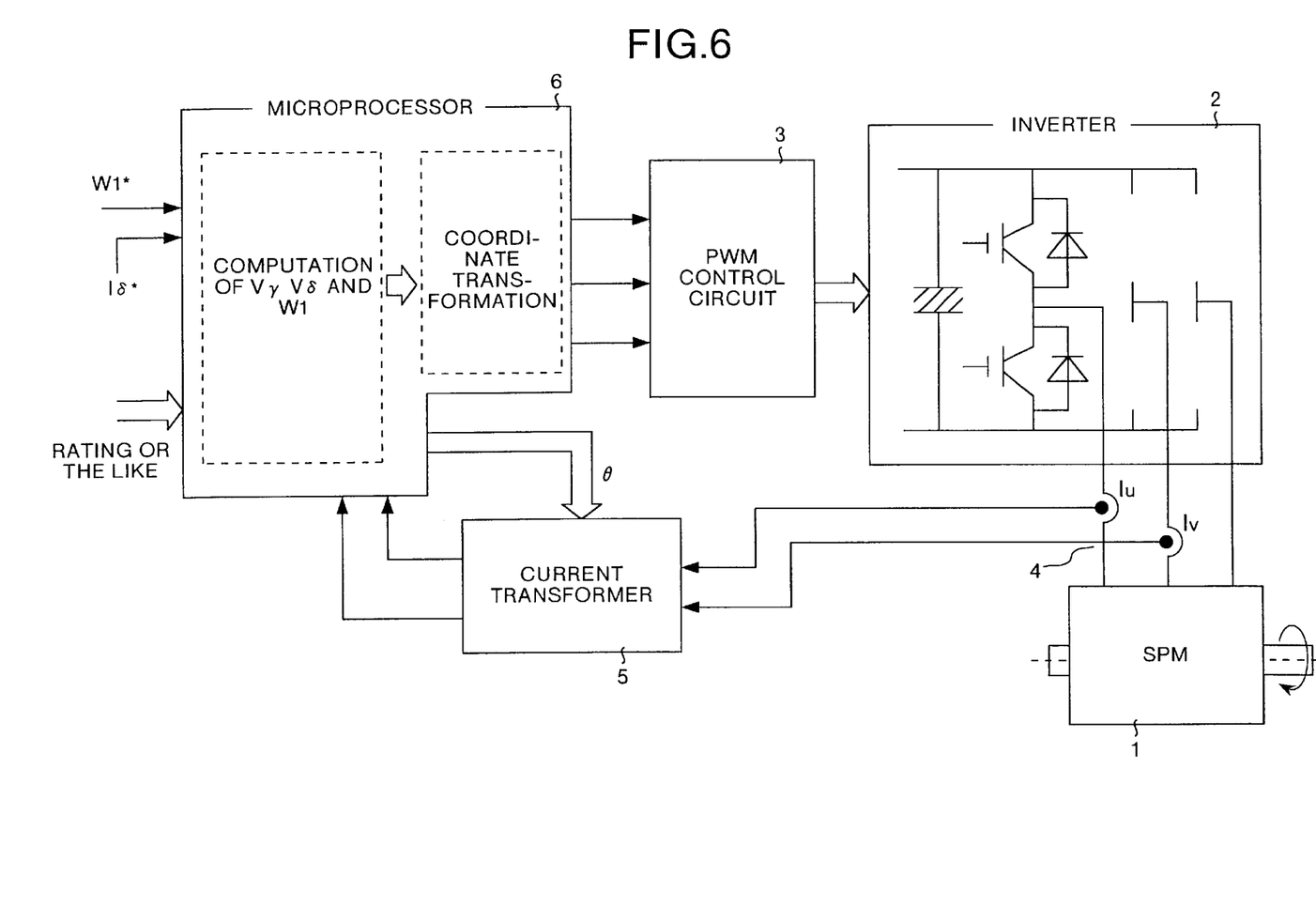
FIG. 6 is a block diagram showing a conventional synchronous motor controlling apparatus.

FIG. 6 is a diagram showing the configuration of a conventional control system disclosed in (c).

synchronous motor controlling apparatus comprises following components. That is, an SPM motor 1, and an inverter 2 which applies a PWM modulated sine wave voltage to the SPM motor. A PWM control circuit 3 generates an ON/OFF signal which has been subjected to PWM to a switch in the inverter 2. A current detector 4 detects current flowing from the inverter 2 to the SPM motor 1. A current converter 5 converts the value of the current detected by the current detector 4 to a γ-δ axis assumed on the rotor. A microprocessor 6 receives the value of the current detected by the current detector 5, calculates a voltage instruction and a primary angular frequency as described in detail below, coordinate converts the voltage, and outputs the resultant to the PWM control circuit 3.

The microprocessor 6 calculates the voltage instruction based on the following equations (1) and (2).

$$V\gamma = R1 \cdot I_\gamma + w1 \cdot \lambda 1\delta - w1 \cdot \lambda \delta est \qquad (1)$$

$$V\delta = R1 \cdot I\delta - K\delta \cdot \lambda \delta est \qquad (2)$$

In these equations, R1 denotes primary resistance, w1 is a primary angular frequency, Kδ is a gain (constant), and λ1δ is a δ-axis component of a primary flux linkage. λδest is expressed by the equation (3).

$$\lambda \delta est = L1 \cdot (I\delta - I\gamma^2 / 2I_0 + I_0 - I\delta^*) \qquad (3)$$

In this equation, L1 denotes an inductance of a primary winding, and $I_0$ is obtained by dividing a flux linkage $\Lambda_0$ by a magnet by L1. That is, $I_0 = \Lambda_0/L1$. Iδ* is obtained by multiplying a primary flux linkage instruction Λδ* by L1. That is, Iδ*=Λδ*/L1.

The primary angular frequency w1 can be calculated using the following equation (4).

$$w1 = w1^* - Km \cdot I\gamma \qquad (4)$$

In this equation, w1* is an angular velocity instruction and Km is a constant of proportionality.

In the conventional methods (a) and (b), however, the velocity is estimated and the vector control is performed. Consequently, gain adjustment of a velocity control system according to the inertia of a load connected to a motor shaft is necessary, and the computation is relatively complicated. In the conventional method (c), the gain setting due to the inertia of the load is unnecessary and the computation amount is small. However, the method (c) relates to the system of the SPM motor and cannot be applied to an IPM motor having different inductances Ld and Lq on a d-q axis fixed to a stator axis and a different torque generating method.

DISCLOSURE OF THE INVENTION

It is an object of the invention to obtain a control method which can be applied to an IPM motor, in which number of calculations is small, and which does not need gain adjustment according to the inertia of a load.

In order to perform a smooth start without a sensor, accurate primary resistance is necessary, so that another object of the invention is to realize a smooth start by obtaining accurate primary resistance in a short time at the time of starting.

BEST MODE FOR CARRYING OUT THE INVENTION

Preferred embodiments of the invention will be described as follows.

First Embodiment

Figure 1:
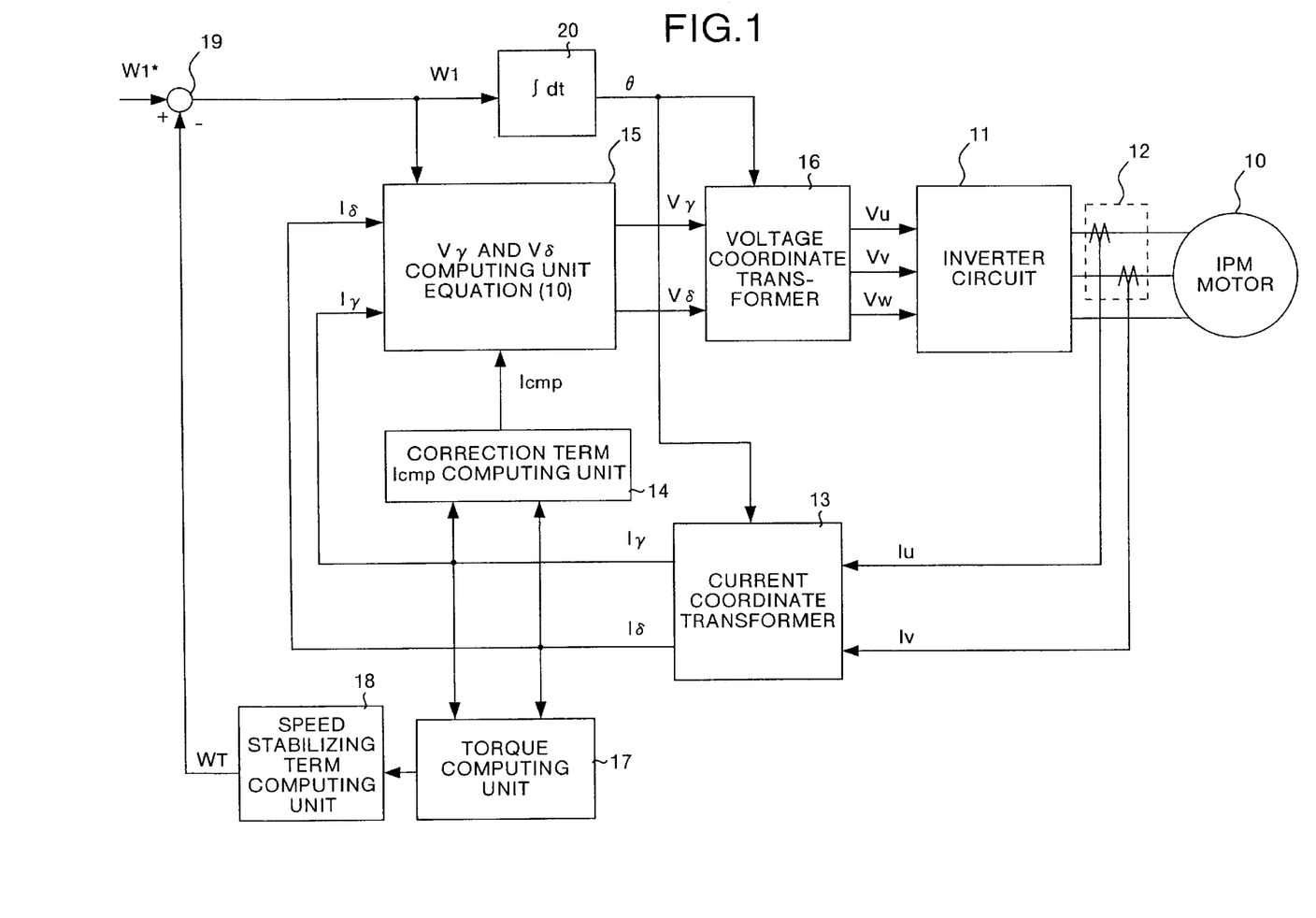
FIG. 1 is a block diagram showing a synchronous motor controlling apparatus according to a first embodiment of the invention.

FIG. 1 is a block diagram showing a synchronous motor controlling apparatus according to a first embodiment of the invention.

This synchronous motor controlling apparatus comprises following components. That is, an IPM motor 10 and an inverter circuit 11 which receives three-phase voltage instructions Vu, Vv, and Vw, converts the voltage instructions into PWM and outputs a PWM voltage through a switch. A current detector 12 detects a current flowing from the inverter circuit 11 to the IPM motor 10. A current coordinate transformer 13 transforms the values of the currents Iu and Iv detected by the current detector 12 onto a γ-δ axis assumed on a rotor to obtain currents Iγ and Iδ. A correction term Icmp computing unit 14 which calculates a correction term Icmp using the currents Iγ and Iδ. A Vγ and Vδ computing unit 15 which calculates voltage instructions Vγ and Vδ. A voltage coordinate transformer 16 which transforms the voltage instructions obtained by the Vγ and Vδ computing unit 15 into the three-phase voltage instructions Vu, Vv, and Vw which are supplied to the inverter circuit 11. A torque computing unit 17 which calculates IPM motor generation torque using the currents Iγ and Iδ. A speed stabilizing term computing unit 18 which calculates a speed stabilizing term $W_T$ from the torque obtained by the torque computing unit 17. A subtracting circuit 19 which subtracts the speed stabilizing term $W_T$ obtained by the speed stabilizing term computing unit 18 from the instructed speed W1* and obtains the primary angular frequency W1. An integrator 20 integrates the primary angular frequency W1 to obtain a phase θ which is used for coordination transformation in the current coordinate transformer 13 and the voltage coordinate transformer 16.

The components in FIG. 1 will now be described specifically. First, a voltage equation and a torque equation of the IPM motor 10 are as shown by equations (5) and (6) on the d-q axis fixed on the rotor axis.

$$\begin{bmatrix} Vd \\ Vq \end{bmatrix} = \begin{bmatrix} R+pLd & -\omega Lq \\ \omega Ld & R+pLq \end{bmatrix} \begin{bmatrix} Id \\ Iq \end{bmatrix} + \begin{bmatrix} 0 \\ \omega \varphi_f \end{bmatrix} \quad (5)$$

$$Tm = Pm \cdot \phi_f \cdot Iq + Pm \cdot (Ld-Lq) \cdot Id \cdot Iq \quad (6)$$

In these equations, Vd and Vq are a d-axis component and a q-axis component of a primary voltage, respectively, R is primary resistance of the IPM motor, ω is a rotor rotation electric angular velocity, pm is the number of pairs of poles, f is a flux linkage by a magnet, Id and Iq are d-axis and q-axis currents, Ld and Lq are d-axis and q-axis inductances, and p is a differential operator d/dt.

In a stationary state, by setting the differential operator p in the equation (5) to zero, the equation (7) is obtained.

$$\begin{bmatrix} Vd \\ Vq \end{bmatrix} = \begin{bmatrix} R & -\omega 1 Lq \\ \omega 1 Ld & R \end{bmatrix} \begin{bmatrix} Id \\ Iq \end{bmatrix} + \begin{bmatrix} 0 \\ \omega 1 \cdot \varphi_f \end{bmatrix} \quad (7)$$

Although the d-q axis is fixed on the rotor axis, the position of the rotor is not known in the case where a sensor is not provided. The γ-δ axis assumed on the stator is usually deviated from the d-q axis. In the case of performing the control in accordance with the invention, the deviation is a little, and the voltage equation in the stationary state on the γ-δ axis is approximated as shown by the following equation (8).

$$\begin{bmatrix} V_\gamma \\ V_\delta \end{bmatrix} = \begin{bmatrix} R & -\omega 1 Lq \\ \omega 1 Ld & R \end{bmatrix} \begin{bmatrix} I_\gamma \\ I_\delta \end{bmatrix} + \begin{bmatrix} 0 \\ \omega 1 \cdot \varphi_f \end{bmatrix} \quad (8)$$

The correction term Icmp computing unit 14 calculates the correction term Icmp based on the following equation (9).

$$Icmp = Ix^* - I\gamma + Kcmp \cdot I\delta 2 \quad (9)$$

In equation (9), Ix* is a correction current instruction and Kcmp is a correction gain.

The Vγ and Vδ computing unit 15 multiplies the correction term Icmp obtained by the equation (9) by a proper gain and adds the resultant to the equation (8), that is, calculates as shown by the equation (10).

$$\begin{bmatrix} V_\gamma \\ V_\delta \end{bmatrix} = \begin{bmatrix} R & -\omega 1 Lq \\ \omega 1 Ld & R \end{bmatrix} \begin{bmatrix} I_\gamma \\ I_\delta \end{bmatrix} + \begin{bmatrix} 0 \\ \omega 1 \cdot \varphi_f \end{bmatrix} + \begin{bmatrix} Kgan \\ Kdel \end{bmatrix} \cdot Icmp \quad (10)$$

With such a configuration, a voltage steadily applied when the currents Iγ and Iδ are passed is positively added and the correction term Icmp is added, thereby assuring stability of the voltage control also in an IPM motor.

The operations of the torque computing unit 17, speed stabilizing term computing unit 18, and subtracting circuit 19 will now be described. As shown by the example of the conventional technique, in the SPM motor, the speed can be stabilized by the equation (4). The stabilization of speed denotes prevention of loss of synchronization.

In the IPM motor, the torque is expressed by the equation (6). A reluctance torque expressed by the right side second term of the equation (6), which does not occur in the SPM motor occurs.

The torque computing unit 17 executes calculation as shown by the following equation (11).

$$T = Pm \cdot \phi_f \cdot I\delta + Pm \cdot (Ld - Lq) \cdot I\gamma \cdot I\delta \quad (11)$$

The speed stabilizing term computing unit 18 and the subtracting circuit 19 obtain the primary angular frequency w1 by using the torque T in a manner similar to the equation (4) shown in the example of the conventional technique, that is, as shown by the equations (12) and (13).

$$w_T = T \cdot Km \quad (12)$$

$$w1 = w1^* - w_T \quad (13)$$

In a manner similar to the reference literature (c) described in the conventional technique, operations are made so that $w_T$ is steadily zero. In such a manner, the speed is stabilized and the control is performed steadily in a state where a speed deviation is zero.

According to the foregoing embodiment, the stable control can be performed by simple calculations such as the equations (9) and (10). Since the control is executed without estimating speed, the gain does not have to be adjusted according to the inertia of the load. Further, as a result of operating point analysis and actual verification, a high-efficiency control effectively using the reluctance torque can be realized by the control method.

Second Embodiment

Figure 2:
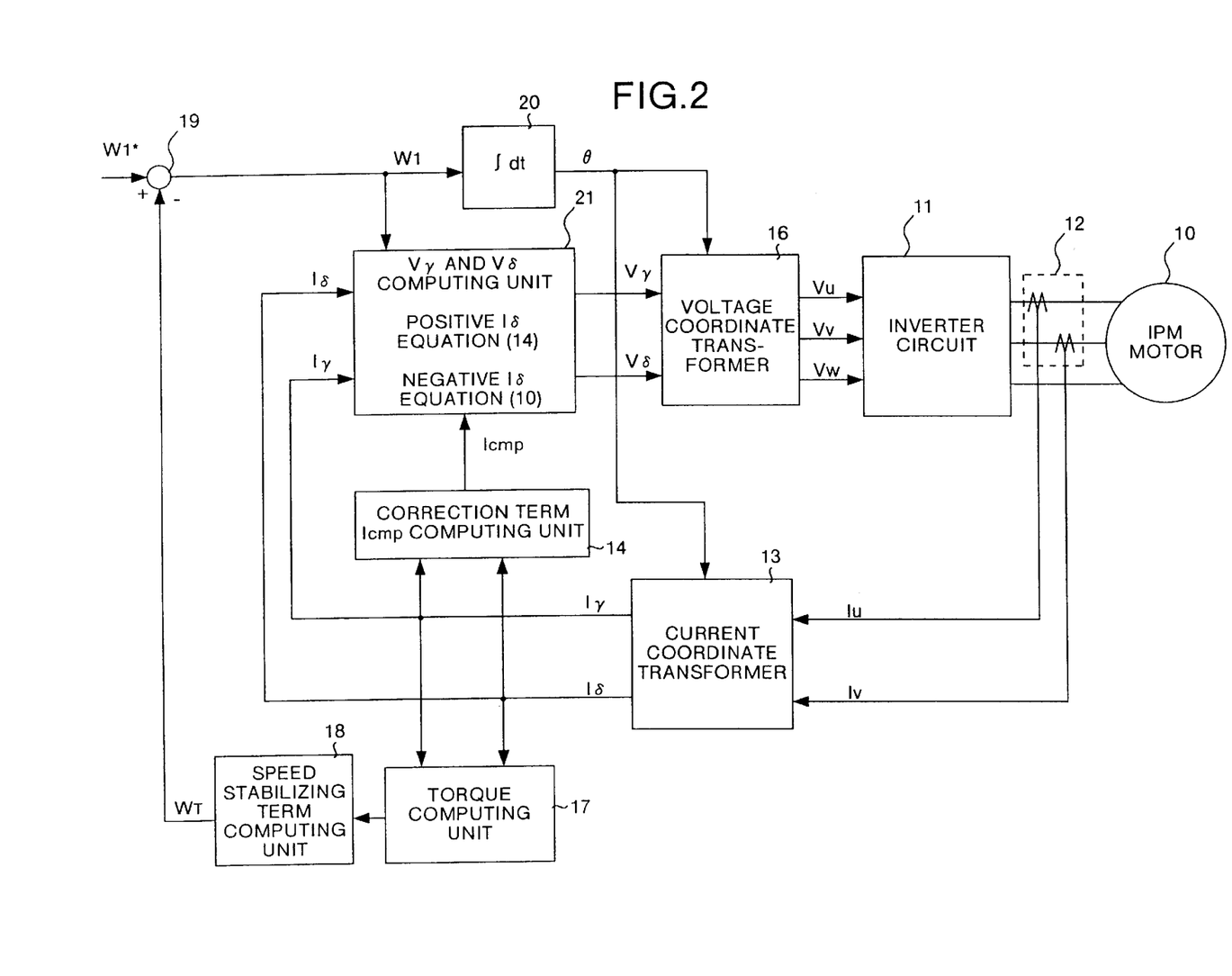
FIG. 2 is a block diagram showing a synchronous motor controlling apparatus according to a second embodiment of the invention.

FIG. 2 is a block diagram showing a synchronous motor controlling apparatus according to a second embodiment of the invention.

In this embodiment, the Vγ and Vδ computing unit 15 in FIG. 1 is replaced with a Vγ and Vδ computing unit 21. The components that perform the same or similar functions as those in the first embodiment have been provided with the same legends and, to avoid repetition of explanation, they will not be described.

When performing the control over a power running/regenerating range, the Vγ and Vδ computing unit 15 described in the first embodiment expressed by the equation (10) is not always stable in various IPM motors. By switching an Iδ component exerting an influence on Vγ and an Iγ component exerting an influence on Vδ, what is called an interference term voltage, so as to be considered or not according to the sign of Iδ, a stable control can be performed.

That is, when Iδ is positive, the following equation (14) is used. When Iδ is negative, the equation (10) is used.

$$\begin{bmatrix} V_\gamma \\ V_\delta \end{bmatrix} = \begin{bmatrix} R & 0 \\ 0 & R \end{bmatrix} \begin{bmatrix} I_\gamma \\ I_\delta \end{bmatrix} + \begin{bmatrix} 0 \\ \omega 1 \cdot \varphi_f \end{bmatrix} + \begin{bmatrix} Kgan \\ Kdel \end{bmatrix} \cdot icmp \quad (14)$$

Further, the following was also confirmed by actual verification. When Iδ is negative, by setting the constant Kcmp of the correction term icmp computing unit 14 to zero or adjusting the interference term of Vδ, the torque characteristic can be improved by low speed regeneration. When Iδ changes from positive to negative, by gradually operating Kcmp and the interference term, the switching can be made without fluctuating speed at the time of switching.

According to the embodiment as described above, even an IPM motor which does not always have good characteristics in various speeds and torques in the control system described in the example of the conventional technique can have good torque characteristics.

In addition, the degree of freedom in designing is very high in an IPM motor. Even when stable controllability cannot be obtained in various speeds and torques, by operating the Ix* and Kcmp in the equation (9) and Kgan, Kdel, and the interference term in the equation (10), the stability can be assured and the excellent torque characteristics can be obtained.

Third Embodiment

Figure 3:
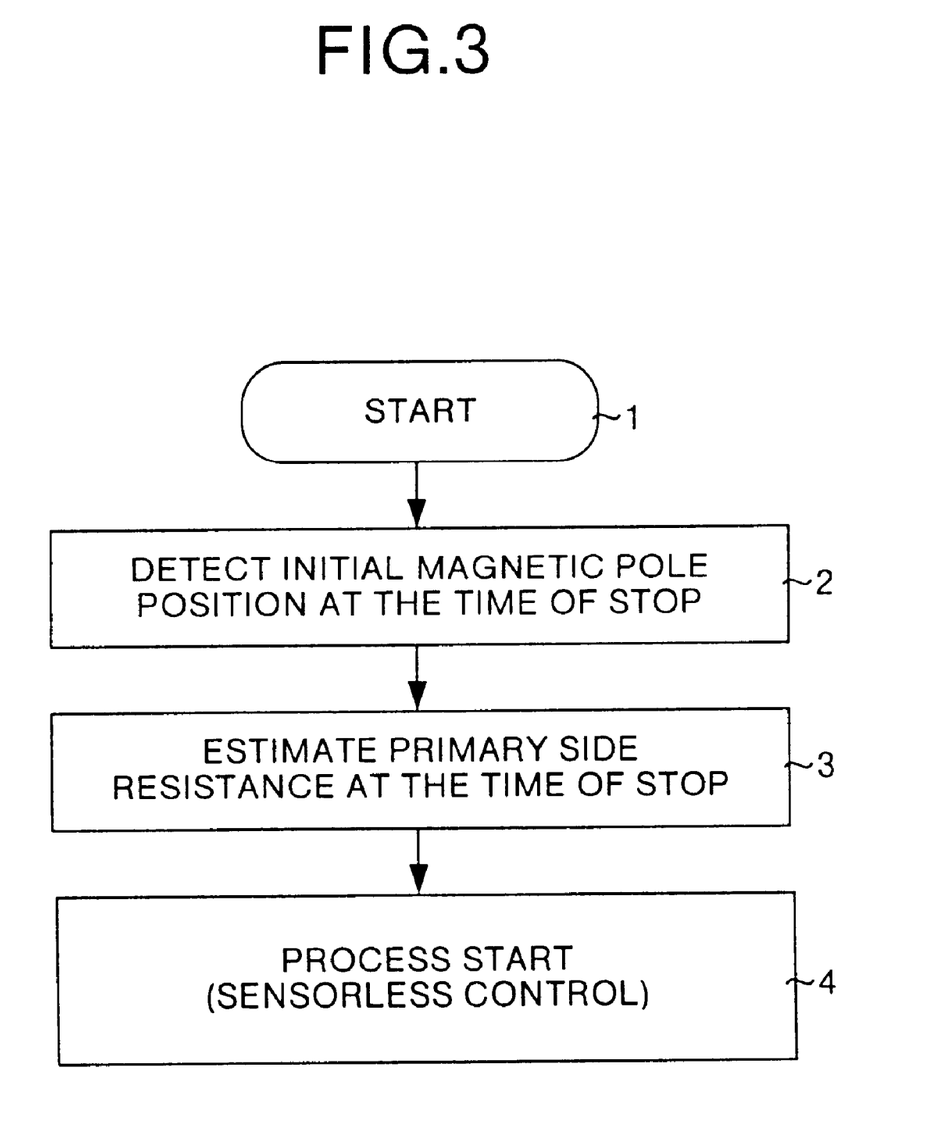
FIG. 3 is a flowchart at the time of the start of a synchronous motor controlling apparatus according to a third embodiment of the invention.

FIG. 3 shows a flowchart at the time of start of a synchronous motor controlling apparatus according to a third embodiment of the invention. At step 1, an operation start signal is supplied. At step 2, an initial magnetic pole position at the time of stop is detected. Various methods are proposed as methods of detecting the initial magnetic pole position at the time of stop, such as "Initial Rotor Position Estimation of Sensorless Salient-Pole Brushless DC motor" (The Transactions of The Institute of Electrical Engineers of Japan, Vol. 116-D, No. 7, 1996) and "Evaluation of Estimation Accuracy in Mechanical Sensor-less Rotor Position Detecting Method of Permanent Magnet Motor using Current Vector Locus" (1995 National Convention of The Industry Applications Society of The Institute of Electrical Engineers of Japan, 180). At step 2, any of the methods can be used and the magnetic pole position is detected with high accuracy. At step 3, a direct current is passed and an IPM motor primary side resistance value is estimated. After that, by using the resistance value obtained at step 3, the motor is started under a sensorless control at step 4. Steps 2 and 3 are carried out in a time as short as possible.

Since the primary resistance value is used in a control equation in the sensorless control, control characteristics change a little by the primary resistance value. The primary resistance value changes according to the temperature of the IPM motor. Consequently, in order to always obtain the same characteristics, it is necessary to reset the primary resistance value which changes according to the temperature to a proper value. Especially, the starting characteristic is apt to be influenced by the resistance value. By detecting the primary resistance of the IPM motor in short time before starting, an excellent starting characteristic can be always obtained at the time of start in the sensorless control at step 4. That is, a phenomenon such that the motor cannot be started due to an overcurrent irrespective of a temperature change is eliminated.

A concrete example of the primary resistance estimating method will be explained with reference to FIG. 4.

Figure 4:
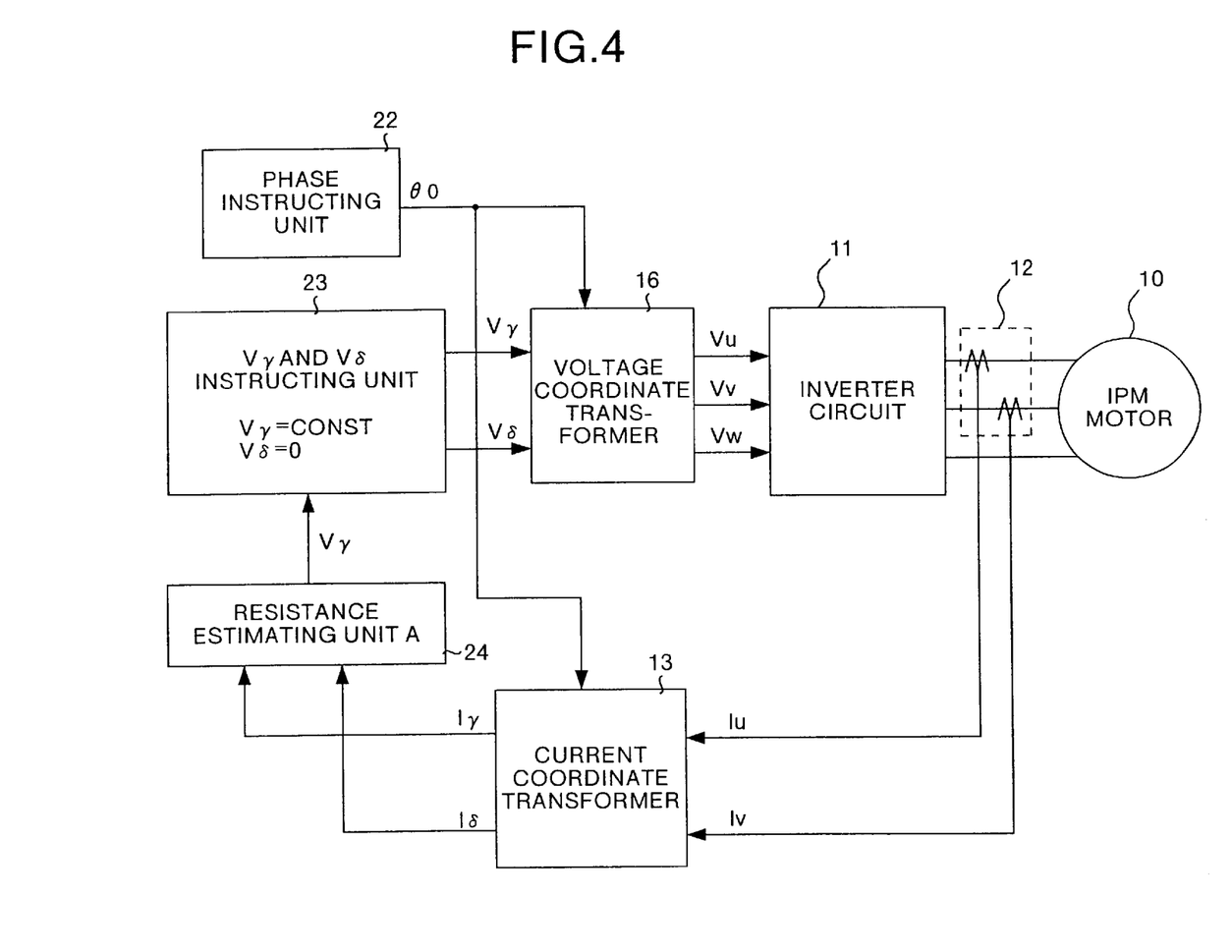
FIG. 4 is a block diagram showing a resistance estimating method of the synchronous motor controlling apparatus in FIG. 3.

In FIG. 4, legend 22 denotes a phase instructing unit which instructs a phase obtained by the detection of the initial magnetic pole position at the time of stop shown in FIG. 3. Legend 23 denotes a Vγ and Vδ instructing unit for instructing that, for example, constant time Vγ=3V (fixed value) and Vδ=0 to the voltage coordinate transformer 16 and, legend 24 denotes a resistance estimating unit A.

In this case, the resistance estimating unit A 24 estimates the primary resistance R using the following equation (15).

$$R = V/\gamma\sqrt{(I\gamma^2 + I\delta^2)} \quad (15)$$

When the magnetic pole position can be estimated without an error, Iδ=0. Consequently, the following equation (16) may be used in place of the equation (15).

$$R = V\gamma/I\gamma \quad (16)$$

It is sufficient to set estimation time to about five times as long as Ld/R and the estimation time is estimated by the equation (15) or (16) at that time point. By using values obtained via a filter as Iγ and Iδ in the equation (15) or (16), variations in the estimation values can be suppressed.

Another concrete example of the primary resistance estimating method will be explained with reference to FIG. 5.

Figure 5:
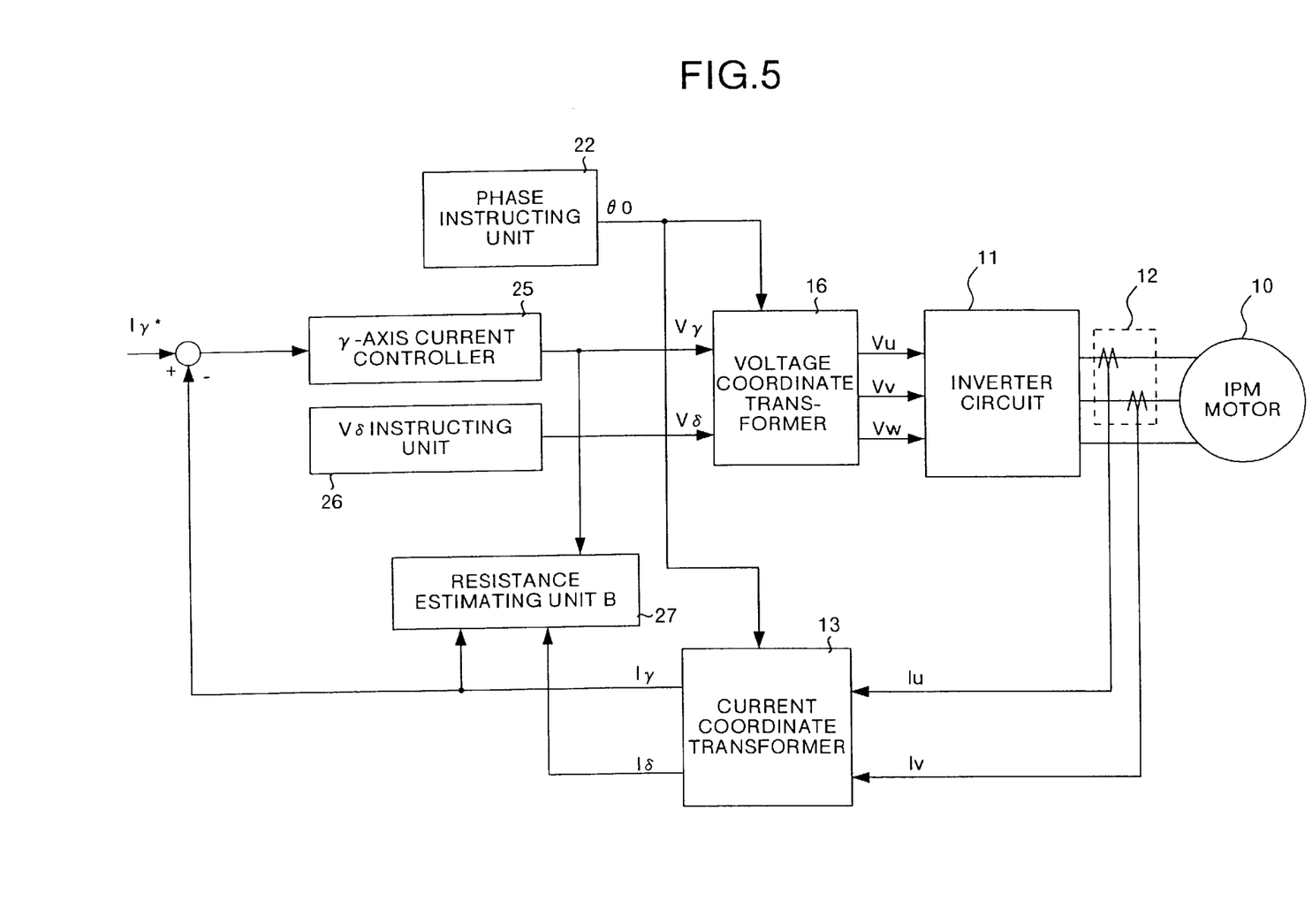
FIG. 5 is a block diagram showing another example of the resistance estimating method of the synchronous motor controlling apparatus in FIG. 3.

In FIG. 5, legend 25 indicates a γ-axis current controller which performs, for example, a proportion/integration control. An output of the γ-axis current controller 25 is Vγ which is supplied to the voltage coordinate transformer 16. Legend 26 denotes a Vδ instructing unit and gives an instruction that Vδ=0. Legend 27 denotes a resistance estimating unit B. In this case, the resistance estimating unit B 27 estimates the primary resistance R by the following equation (17).

$$R = \int (V\gamma - R \cdot I\gamma)dt \quad (17)$$

The estimation time is set to a value about five times as long as Ld/R. The equation (17) is calculated during the estimation time. With such a configuration, the primary resistance estimation value R is automatically derived so that the integration in the equation (17) becomes zero. That is, by a calculation expression similar to the equation (16), resistance is obtained. With such a configuration, estimation can be excellently carried out without exerting an influence on the estimation value by noise.

By performing the starting under the sensorless control by using the primary resistance value estimated as described above, an excellent acceleration characteristic can be always obtained irrespective of the temperature of the IPM motor.

Industrial Applicability

The apparatus and method for controlling a synchronous motor according to the invention can attain a stable control system by simple computation and is particularly suitable for a synchronous motor which drives without detection of rotation speed and the magnetic pole position.

What is claimed is:

1. A synchronous motor controlling apparatus for driving a synchronous motor having a structure in which a permanent magnet is disposed in a rotor, the apparatus comprising:
   a current detecting unit which detects a current passing to said synchronous motor;
   a current coordinate transforming unit which coordinate transforms the current detected by said current detecting unit onto a γ-δ axis assumed on said rotor;
   a correction term computing unit which calculates a correction term on the basis of a provided correction current instruction and the current coordinate transformed by said current coordinate transforming unit; and a voltage instruction computing unit which calculates a γ-δ axis voltage instruction on the basis of a voltage equation in a steady state of said synchronous motor and the correction term calculated by said correction term computing unit.

2. A synchronous motor controlling method of controlling a synchronous motor having a structure in which a permanent magnet is disposed in a rotor, the method comprising the steps of:

detecting a current passing to said synchronous motor;

coordinate transforming the detected current onto a γ-δ axis assumed on said rotor;

computing a correction term on the basis of the derived current and a provided correction current instruction; and computing a γ-δ axis voltage instruction by adding a value obtained by multiplying the correction term by a proper gain to a voltage equation in a steady state of said synchronous motor.

3. The synchronous motor controlling method according to claim 2, wherein the correction term, Icmp is calculated using the relation, $$Icmp = Ix^* - I\gamma + Kcmp \cdot I\delta 2,$$

where, $Ix^*$ is the provided correction current instruction, $I\gamma$ and $I\delta$ are coordinate transformed currents, and Kcmp is a constant.

4. The synchronous motor controlling method according to claim 3, wherein the γ-δ axis voltage instruction is calculated without consideration of an interference term voltage of the γ-δ axis current when Iδ is positive, and calculated in consideration of the interference term voltage when Iδ is negative.

5. A synchronous motor controlling method of controlling a synchronous motor having a structure in which a permanent magnet is disposed in a rotor, the method comprising the steps of:

detecting a current passing to said synchronous motor;

coordinate transforming the detected current onto a γ-δ axis assumed for said rotor;

computing a correction term on the basis of the derived current and a provided correction current instruction; and computing a γ-δ axis voltage instruction by adding a value obtained by multiplying the correction term by a proper gain to a voltage equation in a steady state of said synchronous motor wherein a direct current is passed to a detected magnetic pole position, and a primary side resistance of the synchronous motor is estimated.

* * * * *